Feb. 1, 1966   R. S. BRIGHAM ETAL   3,232,414
ACCELERATING FEED MECHANISM
Filed March 29, 1963   6 Sheets-Sheet 1
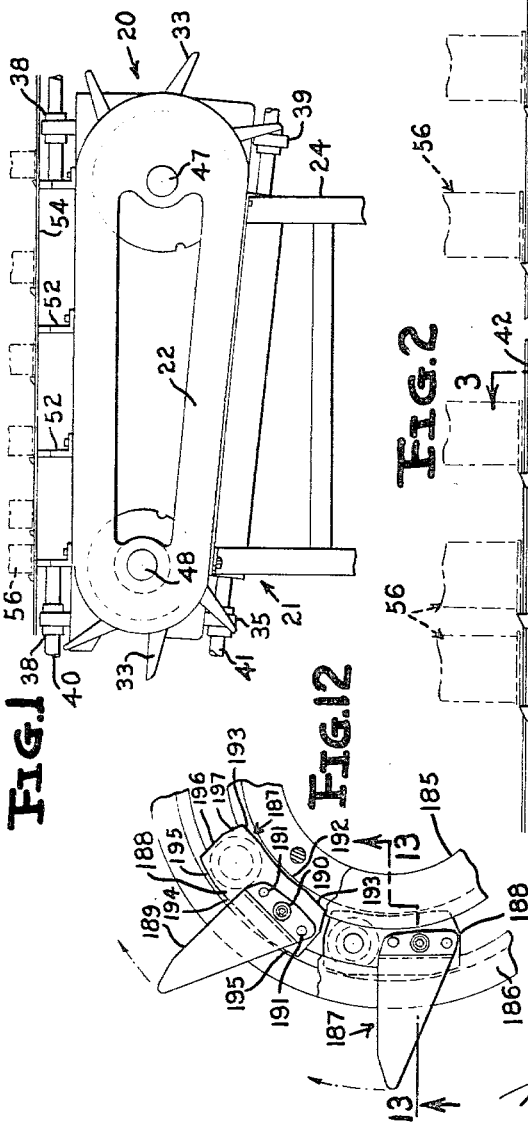
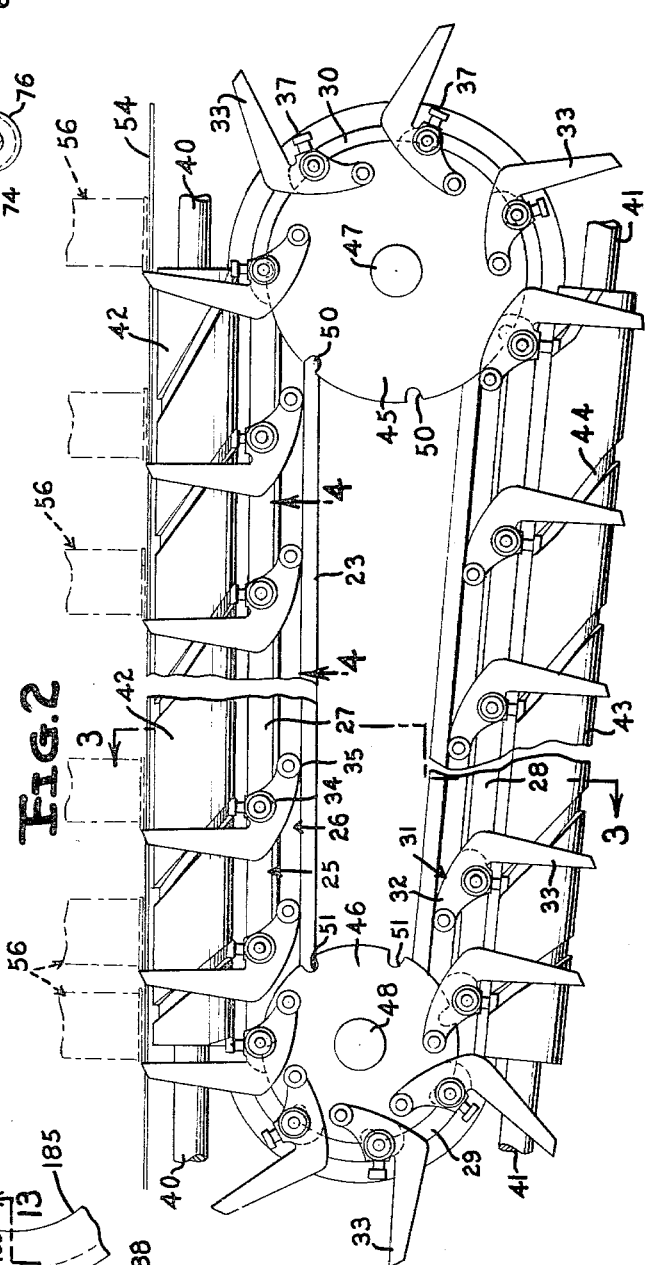
INVENTORS
Roger S. Brigham
& Justin Simpson
BY
Mason, Porter, Diller & Stewart
ATTORNEYS

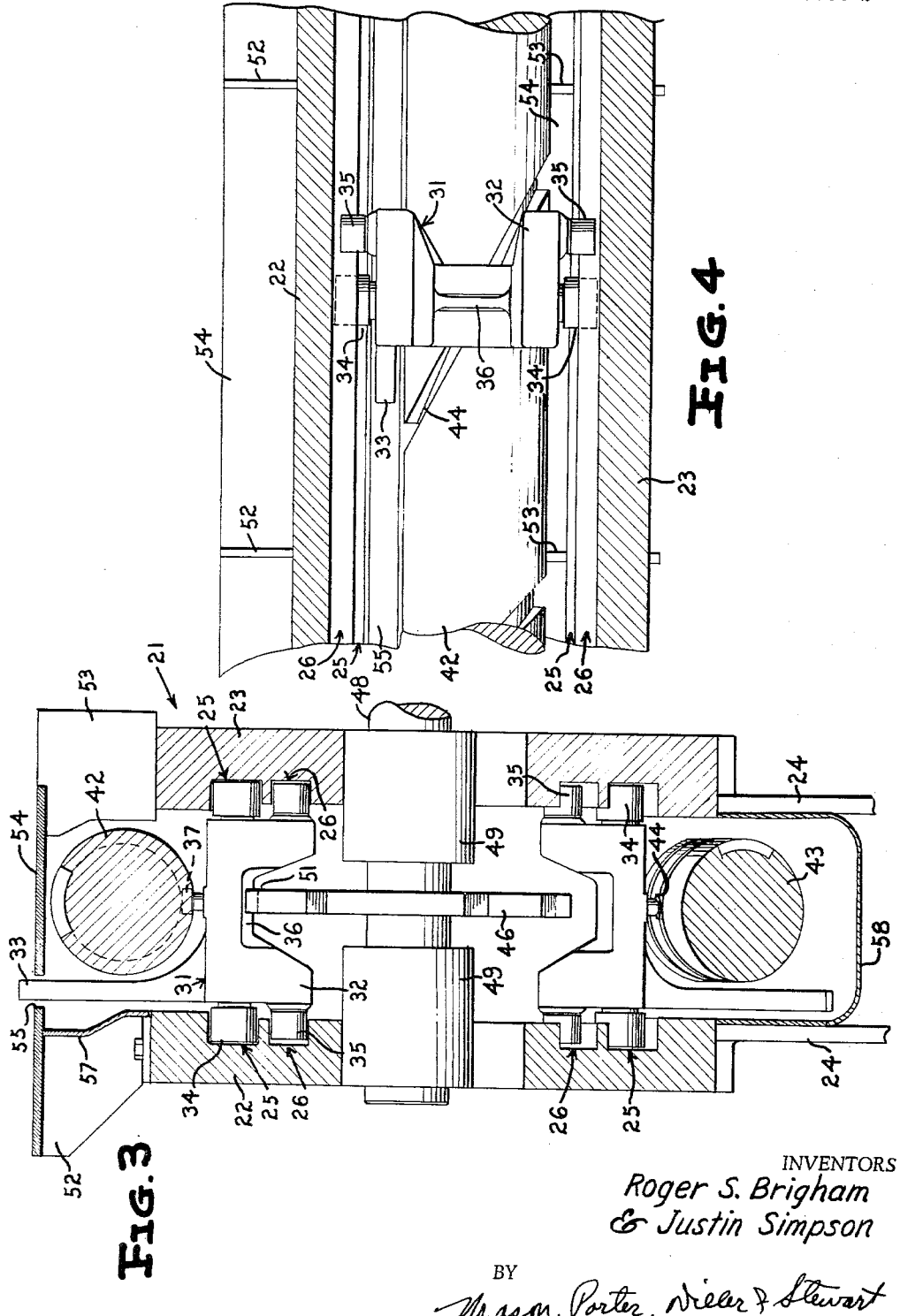

Feb. 1, 1966  R. S. BRIGHAM ETAL  3,232,414
ACCELERATING FEED MECHANISM
Filed March 29, 1963  6 Sheets-Sheet 5
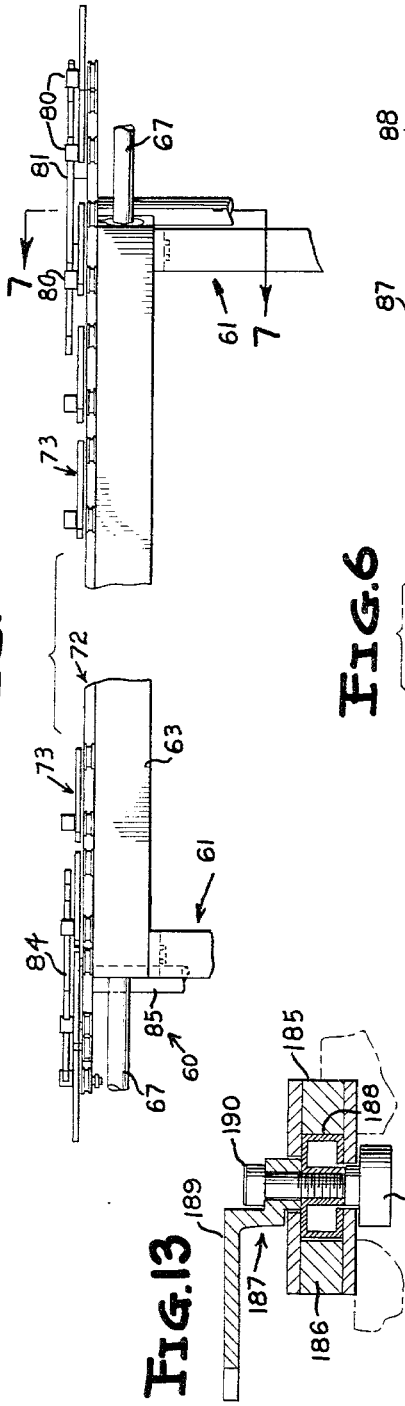
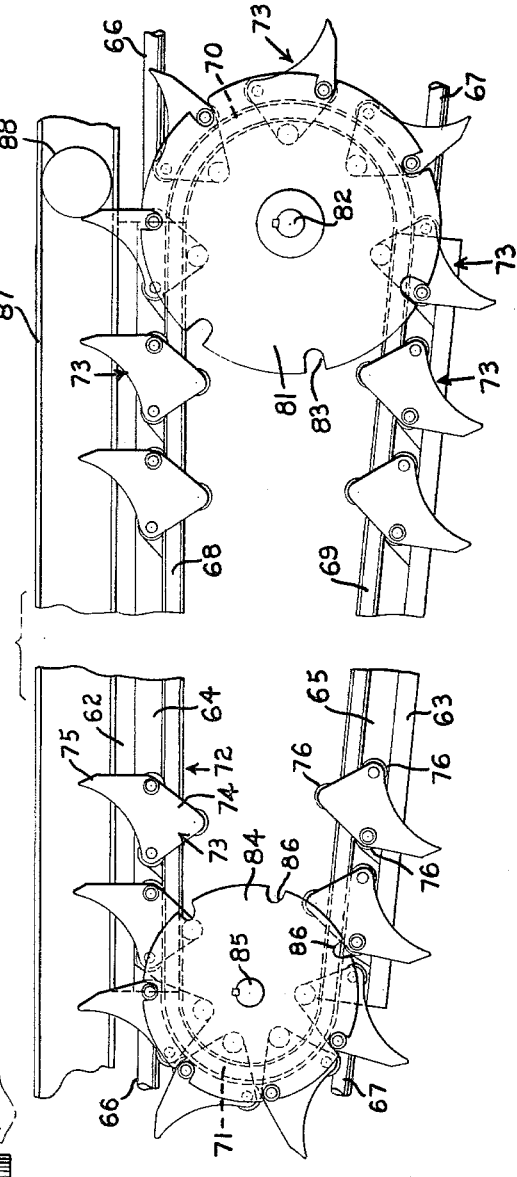
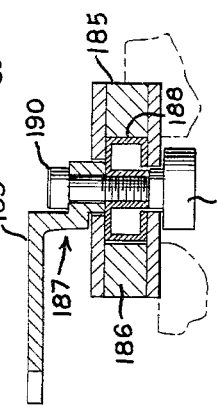
INVENTORS
Roger S. Brigham
& Justin Simpson
BY
Mason, Porter, Diller & Stewart
ATTORNEYS

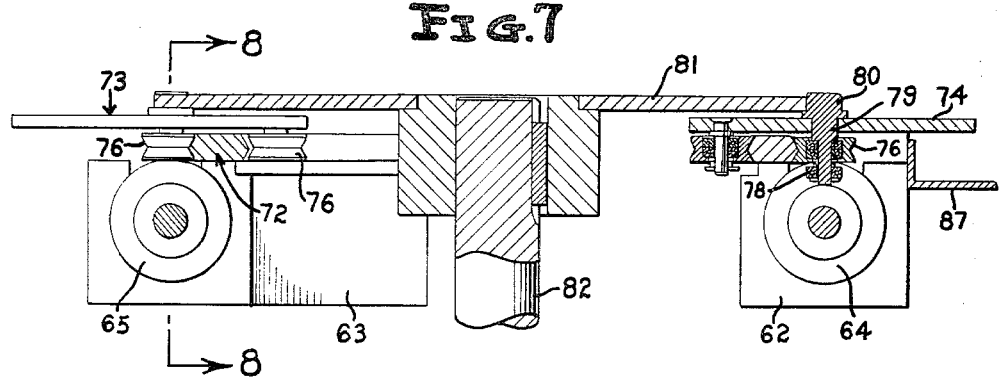
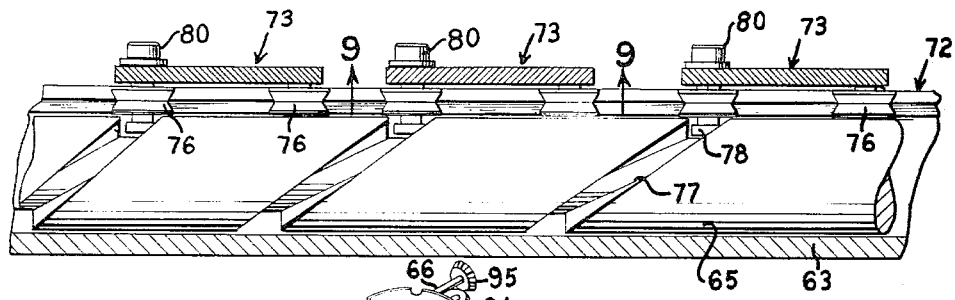
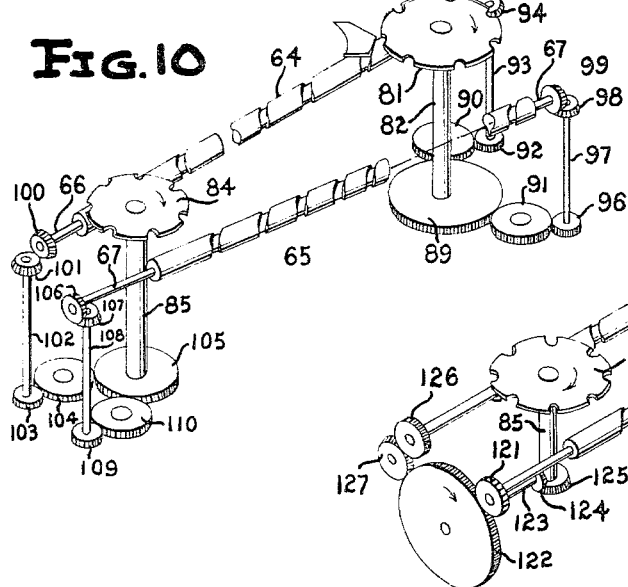
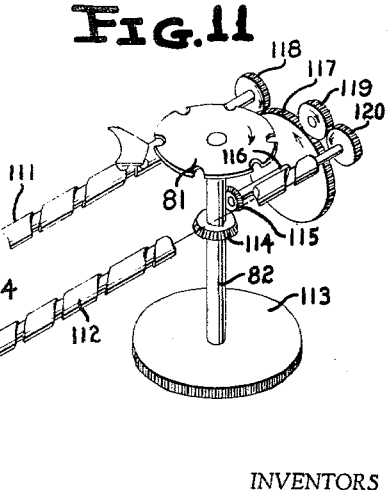

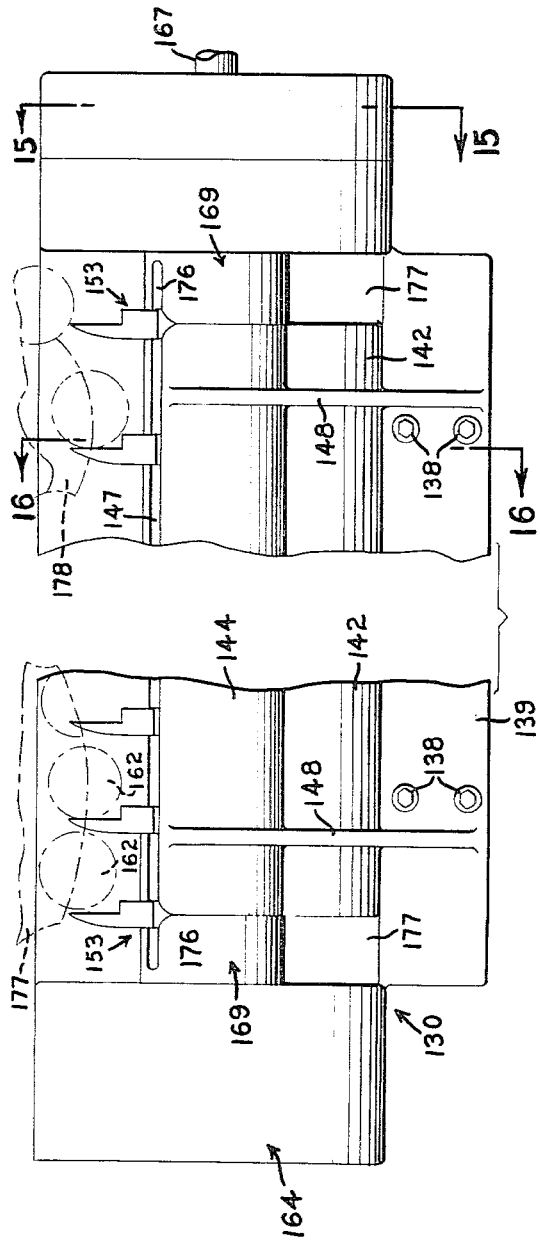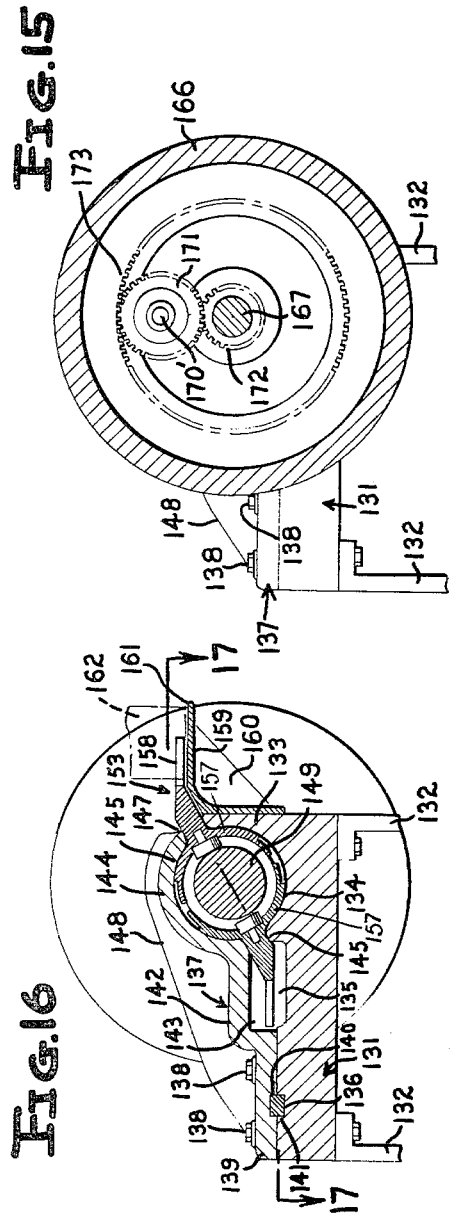
INVENTORS
Roger S. Brigham
& Justin Simpson

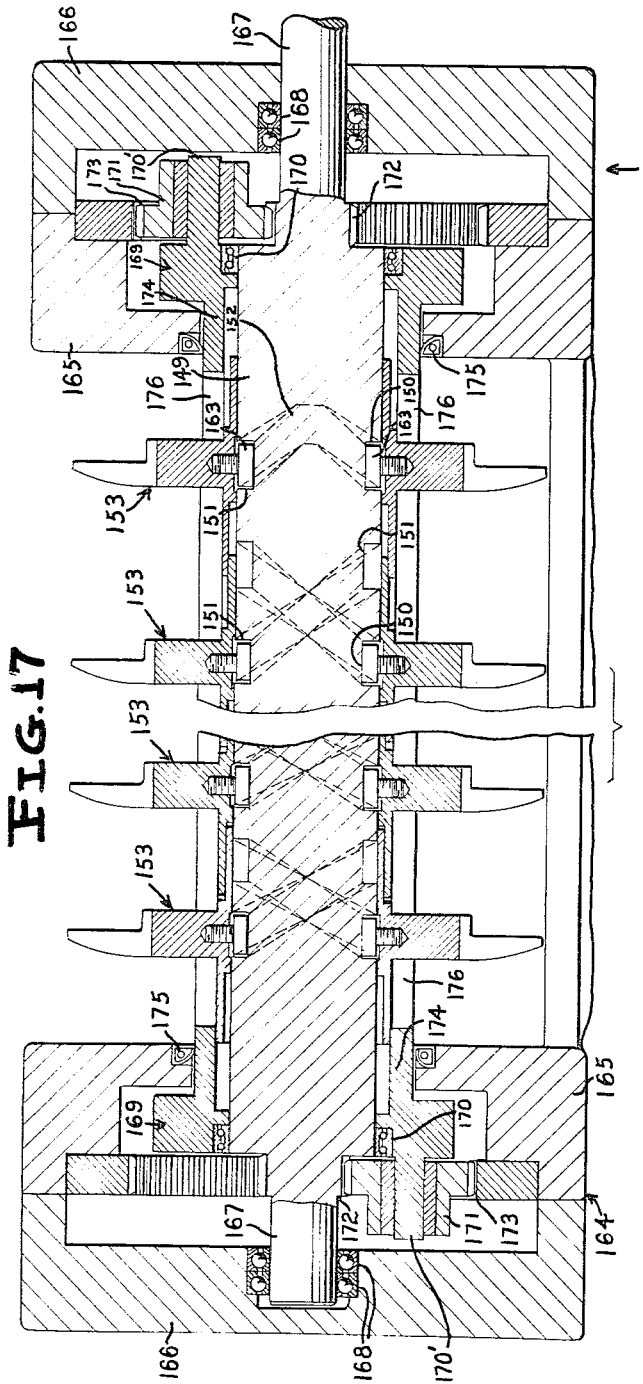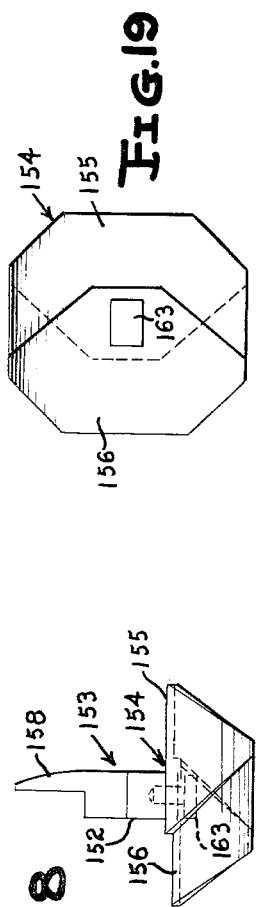
INVENTORS
*Roger S. Brigham*
*& Justin Simpson*

United States Patent Office 3,232,414
Patented Feb. 1, 1966

3,232,414
ACCELERATING FEED MECHANISM
Roger S. Brigham, Crete, and Justin Simpson, Elmhurst, Ill., assignors to Continental Can Company, Inc., New York, N.Y., a corporation of New York
Filed Mar. 29, 1963, Ser. No. 269,007
21 Claims. (Cl. 198—34)

This invention relates in general to new and useful improvements in variable feed or transfer mechanisms, and more particularly to one that may be used to accelerate articles in the feeding thereof and may be in the form of a circulating conveyor.

The invention has been disclosed as being embodied in a mechanism for transferring articles having as a requirement a variation in speed of an article carried thereby between the two ends of travel of the article under the influence of the mechanism. The invention is particularly adapted to be used in the packaging industry wherein cans filled with liquid must be moved from a filling machine to a closing machine and wherein the rate of movement of the can, as affected by the filling machine, is different than that required for the closing machine.

In the usual apparatus for transporting filled cans, such as beer cans, between a filling machine and a closing machine, the mechanism is in the form of a limited and troublesome chain accelerator having two or more abrupt transfers which result in the spilling of the contents of the cans when the cans are filled to the desired level. It is, therefore, a primary object of this invention to provide a novel device for moving articles along a predetermined path and for gradually changing the speed of such articles during their travel.

The customary apparatus now in use for moving articles is a chain type conveyor which requires complex assemblies. These assemblies stretch and thereby effect necessary synchronized timing of the various mechanisms. When these complex chain assemblies are excessively worn, they can be replaced only as a complete assembly at a very high cost. It is, therefore, another object of this invention to provide an endless type of conveyor suitable for replacement of present chain assemblies and which is completely devoid of complicated elements which are subject to stretching and undue wear and wherein individual worn parts may be replaced so as to reduce the cost of repairs.

In accordance with this invention, it is proposed to provide an apparatus which utilizes a plurality of feed members suitably guided for movement about an endless path and wherein the feed members are speeded up along one portion of the endless path and slowed down along a similar portion of the endless path whereby sudden changes in the velocity of the articles being fed thereby are eliminated.

A further object of this invention is to provide a novel mechanism of the endless circulating type wherein a plurality of feed members are guided for movement about an endless path and wherein at least one feed screw is engaged with the feed members to effect the movement of the feed members along the predetermined path.

Another object of this invention is to provide a novel circulating mechanism which includes suitable guide means defining an endless path including two straight portions and curved portions at the ends of the straight portions, there being engaged with the guide means for movement along the endless path a plurality of feed members, and there being associated with each of the straight portions a feed screw for moving the feed members along the straight portions, the feed screws varying in pitch between opposite ends thereof so as to effect an acceleration or deceleration, as desired, of the feed member moving therealong.

Another object of this invention is to provide a novel endless circulating feed mechanism for feeding articles along a predetermined line, the feed mechanism including guide means for guiding a plurality of feed members along an endless path including two straight portions and two curved portions, there being provided feed screws for moving the feed members along the straight portions with the pitch of the feed screws varying from one end to the other so as to provide for a separation of the feed members moving along one of the straight portions and a bringing together of the feed members moving along the other of the straight portions, the feed mechanism also including transfer wheels disposed at the ends of the straight portions for engaging the feed members and effecting the movement thereof around the curved portions in timed relation to the feeding of the feed members by the feed screws.

Still another object of this invention is to provide a novel feed mechanism of the endless circulating type in accordance with the foregoing wherein the construction thereof is readily adaptable to being disposed either in a vertical plane or in a horizontal plane.

A further object of this invention is to provide a feed mechanism of the endless circulating type wherein by rotating the feed screws in opposite directions, two identical feed screws may be utilized.

A still further object of this invention is to provide a novel feed mechanism of the endless circulating type in accordance with the foregoing wherein the construction of the feed mechanism is of such a nature wherein the straight portions of the endless path may either be parallel or in slight diverging relation.

Another object of this invention is to provide a novel endless circulating feed mechanism which utilizes but a single feed screw of the double thread type and there being associated with the feed screw a plurality of feed members which are mounted for movement along the feed screw in opposite directions and along two paths disposed in diametrically opposite relation.

Another object of this invention is to provide an endless circulating feed mechanism of the type set forth above wherein each feed member is provided with a sleeve portion directly engaged with the feed screw wherein the feed screw in part functions as a guide for the feed members and the feed members at the same time serve to protect the feed screw against foreign matter.

Still another object of this invention is to provide a novel endless circulating feed mechanism of the type set forth above wherein there are provided rotating drive members at the ends of the feed screw to effect the partial rotation of the feed members about the feed screw at the ends of the threads thereof to assure the movement of the feed member past the normal dead spots in the feed screw and to assure the proper alignment of the feed members with the paths of movement outlined for the feed members.

A still further object of this invention is to provide a novel endless circulating feed mechanism which is of a relatively simple construction whereby it is economically feasible and wherein the individual parts thereof are readily replaceable so that upkeep thereof is low as compared to endless feeders of the chain type.

With the above and other objects in view that will hereinafter appear, the nature of the invention will be more clearly understood by reference to the following detailed description, the appended claims and the several views illustrated in the accompanying drawings.

In the drawings:

FIGURE 1 is an elevational view of one form of circulating feed mechanism in accordance with this invention and shows generally the details thereof.

FIGURE 2 is an enlarged fragmentary elevational view of the feed mechanism of FIGURE 1 with intermediate portions thereof broken away and a side frame member removed, the view clearly illustrating the specific details of the invention.

FIGURE 3 is an enlarged fragmentary vertical sectional view taken along the line 3—3 of FIGURE 2 showing the specific manner in which the feed members are guided and driven, the removed frame member being shown.

FIGURE 4 is an enlarged fragmentary horizontal sectional view looking up at the underside of the uppermost portion of the feed mechanism and shows further the specific details of a conveying member, the manner in which the feed member is mounted, and the details of the associated feed screw.

FIGURE 5 is an elevational view with an intermediate portion thereof omitted of a horizontally disposed form of endless feed mechanism in accordance with this invention.

FIGURE 6 is a plan view of the endless feed mechanism of FIGURE 5, an intermediate portion of the mechanism being omitted.

FIGURE 7 is an enlarged fragmentary vertical sectional view taken along the line 7—7 of FIGURE 5 and shows the specific details of the mounting of the feed members on a guide track, the manner in which the feed members are driven by the feed screws and the manner in which the feed members are transferred from one feed screw to another by means of a transfer wheel.

FIGURE 8 is an enlarged fragmentary vertical sectional view taken along the line 8—8 of FIGURE 7 and shows further the specific details of the relationship of the feed members with respect to one of the guide tracks and one of the feed screws.

FIGURE 9 is an enlarged fragmentary horizontal sectional view looking up from beneath and shows further the manner in which a feed member is mounted on the guide track.

FIGURE 10 is a schematic perspective view showing the manner in which the feed screws and transfer wheels are driven in unison when the feed screws are identical and in diverging relation.

FIGURE 11 is a schematic perspective view similar to FIGURE 10 and shows the drive means for driving the feed screws and transfer wheels in unison when the feed screws are parallel.

FIGURE 12 is a plan view with parts broken away and showing a modified form of guide track and feed member arrangement.

FIGURE 13 is a fragmentary transverse vertical sectional view taken generally along the line 13—13 of FIGURE 12 and shows further the details of the guide track and feed member of FIGURE 12.

FIGURE 14 is a plan view of still another form of circulating feed mechanism in accordance with the invention with intermediate portions thereof being omitted.

FIGURE 15 is an enlarged fragmentary vertical sectional view showing the details of a planetary gearing for driving the feed members at the end of the feed screws in timed relation to the rotation of the feed screw.

FIGURE 16 is a fragmentary transverse vertical sectional view taken along the line 16—16 of FIGURE 14 and shows the specific details of the relationship of a guide frame, the feed screw and the feed members.

FIGURE 17 is an enlarged fragmentary generally horizontal sectional view taken along the line 17—17 of FIGURE 14 and shows the specific relationship of the feed members with respect to one another and to the feed screw and the specific details of the drive means at the ends of the feed screw for effecting the driving of the drive members disposed at the ends of the screw to partially rotate the feed members around the feed screw.

FIGURE 18 is a rotated side elevational view of one of the feed members removed from the rest of the feed mechanism.

FIGURE 19 is a bottom view of the feed member of FIGURE 18 and shows the specific configuration of the sleeve like portion thereof which provides for the necessary clearance of the overlapped sleeve portions as the feed members are transferred from one side of the feed screw to the other.

Referring now to the drawings in detail, reference is first made to the embodiment of the invention specifically illustrated in FIGURES 1, 2, 3 and 4. The circulating feed mechanism illustrated in these figures is generally referred to by the numeral 20 and includes a suitable frame, generally referred to by the numeral 21. The frame 21 includes a pair of side plates or frame members 22 and 23 which are vertically disposed and are in generally spaced parallel relation, as is shown in FIGURE 3. The side plates 22 and 23 are supported by suitable structural frame elements 24 which may be of any desired type and which are best shown in FIGURE 1.

The opposed faces of the side places 22 and 23 are provided with guideways therein disposed in opposed relation. These guideways include an outer guideway 25 and an inner guideway 26 in each of the side plates 22 and 23 with the guideways 25 being opposed and the guideways 26 being opposed, and both of the guideways 25 and 26 being endless. As is best shown in FIGURE 2 each of the guideways 25 includes a pair of straight portions 27 and 28 which are connected at the ends by curved portions 29 and 30. The straight portions 27 and 28 are illustrated in diverging relation although it is possible for these straight portions to be in parallel relation. The guideways 26 are similarly configurated.

The feed mechanism 20 includes a plurality of feed members each generally referred to by the numeral 31. Each feed member 31 includes a body 32 having a push arm 33 extending therefrom. The body 32 is provided at the opposite sides thereof with followers 34 and 35 which are engaged in the guideways 25 and 26, respectively, as is shown in FIGURE 3. The followers 34 and 35 are preferably mounted for rotation relative to the body 32.

As is clearly shown in FIGURE 3, the body 32 is of a generally V-shaped cross section and the push arm 33 associated therewith is offset to one side thereof. The central part of the body 32, as is clearly shown in FIGURE 4, is configurated to define an inwardly facing rib or bar 36 which extends generally transversely between the side plates 22 and 23. The outer portion of the body 32 is provided with a centrally located follower 37 which is suitably pivotally mounted with respect to the body 32.

The frame 21 is provided with suitable bearings 38 and 39 which support shaft portions 40 and 41 of feed screws 42 and 43, respectively. Each of the feed screws 42 and 43 is provided with a groove 44 in the outer surface thereof and in which groove the followers 37 of the feed members 31 are seated. The grooves 44 are of a generally screw type and the pitch of each groove 44 changes from one end of the associated feed screw to the other. It is to be understood that the two feed screws 42 and 43 are of a similar construction and if they are rotated in opposite directions, the two feed screws 42 and 43 may be identical. On the other hand, if it is desired to rotate the two feed screws in the same direction, then the groove 44 in one of the feed screws must be of a left-hand thread and the groove in the other of the feed screws of a right-hand thread. As will be described in detail hereinafter, the pitch of the groove 44 in each feed screw may be varied in accordance with the feed requirements of the feed mechanism.

The feed mechanism 20 also includes a pair of transfer wheels 45 and 46 disposed at opposite ends of the feed screws 42 and 43. The transfer wheels 45 and 46 are vertically disposed and are carried by horizontal shafts 47 and 48, respectively, which are suitably journalled in bearing means 49 carried by the side plates 22 and 23. In the illustrated form of the invention shown in FIGURE 2, the transfer wheel 45 is provided with pockets 50 which are spaced apart in accordance with the spacing of the feed members 31 at the adjacent ends of the feed screws 42 and 43. In a like manner, the transfer wheel 46 is provided with pockets 51 which are spaced apart in accordance with the spacing of the feed members 31 at the associated ends of the feed screws 42 and 43. Since the feed members 31 are more widely spaced apart when engaged by the transfer wheel 45 than when engaged by the transfer wheel 46, it will be readily apparent that the pockets 50 are more widely spaced than the pockets 51 and the transfer wheel 45 is of a larger diameter than the transfer wheel 46.

No drive means has been specifically illustrated for driving the feed screws 42 and 43 and the transfer wheels 45 and 46. However, it is to be understood that suitable gear type drive means will be provided for driving the feed screws 42 and 43 and the transfer wheels 45 and 46 in unison. In the form of the invention illustrated in FIGURE 1, the feed members 31 will be fed from left to right by the feed screw 42 with the spacing between the feed members increasing. When the feed members 31 reach the right end of the feed screw 42, the bars 36 thereof are engaged by the pockets 50 and the feed members are transferred from the right end of the feed screw 42 to the right end of the feed screw 43 by the transfer wheel 45. Through the accurate timing of the driving of the transfer wheel 45, the followers 37 of the feed members are aligned with the groove 44 when they are presented to the right end of the feed screw 43 so that they immediately enter the groove 44 of the feed screw 43 and the feed members are then driven by the feed screw 43. As the feed members 31 move from right to left along the feed screw 43, they are brought closer together so that the spacing of the feed members 31 at the left end of the feed screw 43 is the same as that at the left end of the feed screw 42. The pockets 51 of the transfer wheel 46 engage the bars 36 of the feed members 31 when the feed members reach the left end of the feed screw 43 and serve to transfer the feed members 31 back to the feed screw 42.

The side plates 22 and 23 support suitable brackets 52 and 53 which serve to support an article support 54 in overlying relation to the feed screw 42. The article support 54 is provided with an elongated slot 55 through which the upper ends of the push arms 33 pass. The upper ends of the push arms 33 may be configured in any desired manner, and, as is schematically illustrated in FIGURE 1, serve to push cans 56 along the article support 54.

A suitable guard 57 underlies the article support 54 adjacent the path of movement of the push arms 33. Also, a suitable lower casing 59 is disposed at the lower edges of the side plates 22 and 23 and are supported by the structural elements 24 of the frame.

Reference is now made to FIGURES 5 through 11 wherein there is illustrated a horizontal operating modification of the recirculating feed mechanism, this feed mechanism being generally referred to by the numeral 60. The feed mechanism 60 includes a suitable frame structure, generally referred to by the numeral 61. The frame structure includes a pair of longitudinally extending housings 62 and 63 which are best shown in FIGURES 6 and 7 and in which there are mounted feed screws 64 and 65, respectively. The feed screw 64 is provided with terminal shaft portions 66 whereas the feed screw 65 is provided with terminal shaft portions 67 to effect the driving thereof.

The housings 62 and 63 support an endless track which includes a straight portion 68 overlying and suitably secured to the housing 63, a large radius curved portion 70 secured to the right ends of the straight portions 68 and 69 and a smaller radius curved portion 71 secured to the left ends of the straight portions 68 and 69.

The endless track, which is generally referred to by the numeral 72, carries a plurality of feed members, generally referred to by the numeral 73. Each feed member 73 includes a flat plate like body 74 having a push arm 75 extending therefrom. Each body 74 has mounted on the underside thereof three followers 76, arranged in a triangular pattern with two of the followers 76 engaging the outer surface of the endless track 72 and the other of the followers engaging the inner surface of the endless track 72.

Reference is now made to FIGURE 7 wherein it will be seen that each of the followers 76 is of the V-curved type and each portion of the endless track 72 has an edge configuration for reception in the V-grooves of the followers 76 so that the feed members 73 are so interlocked with the endless track 72 to be limited to movement relative to the endless track 72 in a direction longitudinally of the endless track 72.

In FIGURES 7 and 8 it is shown that the feed screws 64 and 65 each has a groove 77 therein receiving a follower 78 carried by each of the feed members 73. Each follower 78 is mounted beneath the leading one of the two outer followers 76. It is to be noted that the followers 78 and their associated followers 76 are mounted on stub shafts 79 for rotation, and each stub shaft 79 has a rounded head 80 disposed about the body 74.

It will be readily apparent that the feed screws 64 and 65 will move the feed members 73 along the straight portions 68 and 69 of the endless track 72. However, when the feed members 73 start to pass around the curved portions 70 and 71 of the track, they become disengaged from the feed screws 64 and 65. To effect the movement of the feed members 73 around the curved portion 70, there is provided a transfer wheel 81. The transfer wheel 81 is mounted on a suitable vertical shaft 82 and is provided about the periphery thereof with a plurality of pockets 83. The spacing of the pockets 83 corresponds to the spacing of the feed members 73 at the right ends of the feed screws 64 and 65. As the transfer wheel 81 rotates, the pockets 83 receive the rounded heads 80 and feed the feed members 73 around the curved portion 70.

A second transfer wheel 84 is associated with the curved portion 71 and is supported by a vertical shaft 85. The transfer wheel 84 also is provided with pockets 86 which are spaced apart in accordance with the spacing of the feed members 73 at the left ends of the feed screws 64 and 65. The pockets 86 also receive the rounded heads 80 and serve to drive or feed the feed members 73 around the curved portion 71.

It is to be noted that a generally trough shaped article support 87 is illustrated adjacent the housing 62 in FIGURES 6 and 7. As the feed members 73 move along the feed screw 64, the push arms 75 thereof overlie and move along the article support 87 to move articles, such as a can 88 illustrated in FIGURE 6, along the article support 87.

Reference is now made to FIGURE 10 wherein there is illustrated a drive mechanism for simultaneously driving the feed screws 64 and 65 and the transfer wheels 81 and 84. In accordance with this invention, either one of the vertical drive shafts 82 and 85 may be suitably driven by any desired drive mechanism, such as the main lower drive gear of a seamer. The shaft 82 is provided with a large gear 89 which is meshed with a pair of idler gears 90 and 91. The idler gear 90 is meshed with a gear 92 disposed on the lower end of a shaft 93 which is provided at its upper end with a bevel gear 94. The bevel gear 94 is meshed with a bevel gear 95 carried by the right hand terminal shaft portions 66 of the feed screw 64.

The idler gear 91 is meshed with a gear 96 carried at the lower end of a vertical shaft 97 which is provided at its upper end with a bevel gear 98. The bevel gear 98 is meshed with a bevel gear 99 carried by the right hand terminal shaft portion 67 of the feed screw 65. It is to be noted that the arrangement of the bevel gears 94 and 95 as compared to the arrangement of the bevel gears 98 and 99 provides for the opposite rotation of the feed screws 64 and 65. In this manner, the feed screws 64 and 65 may be identical. However, if the feed screws 64 and 65 were of left and right hand configuration, then the bevel gear arrangement 94 and 95 may be the same as the bevel gear arrangement 98 and 99.

The left hand terminal shaft portion 66 of the feed screw 64 is provided with a bevel gear 100 meshed with a bevel gear 101 disposed at the upper end of a vertical shaft 102. The gear 103 mounted at the lower end of the vertical shaft 102 is meshed with an idler gear 104 which, in turn, is meshed with a drive gear 105 carried by the vertical shaft 85.

The drive gear 105 is also driven through the feed screw 65 by means of a bevel gear 106 mounted on the left hand terminal shaft portion 67 and meshed with a bevel gear 107 carried at the upper end of a vertical shaft 108. A gear 109 carried at the lower end of the vertical shaft 108 is meshed with an idler gear 110 which, in turn, is meshed with the drive gear 105. It is to be noted that the arrangement of the bevel gears 100 and 101 is different from that of the bevel gears 106 and 107 due to the dissimilar rotation of the feed screws 64 and 65. If the feed screws 64 and 65 are rotated in the same direction, then the arrangement of the bevel gears 100 and 101 may be like that of the bevel gears 106 and 107.

FIGURE 11 illustrates an arrangement wherein a pair of feed screws 111 and 112 arranged in parallel relation may be driven by a simpler arrangement. When the feed screws are parallel, the vertical shaft 82, for example, may be suitably driven through a drive gear 113, which may be an existing gear in a base transmission of a seamer, and the vertical shaft 82 may be provided with a bevel gear 114 intermediate the ends thereof. The bevel gear 114 has meshed therewith a bevel gear 115 which is carried by a horizontal shaft 116. The horizontal shaft 116 carries a gear 117 with which there is meshed a gear 118 secured to the feed screw 111. An idler gear 119 is meshed also with the gear 117 and is, in turn, meshed with a gear 120 carried by the feed screw 112 to effect the rotation of the feed screw 112 in a direction opposite from the direction of the feed screw 111.

The left end of the feed screw 112 is provided with a gear 121 which is meshed with a gear 122 carried by a horizontal shaft 123. The horizontal shaft 123 is provided with a bevel gear 124 which is meshed with a bevel gear 125 carried by the lower end of the shaft 85 to drive the transfer wheel 84. The transfer wheel 84 is also driven through the feed screw 111 by means of a gear 126 mounted thereon and an idler gear 127 which, in turn, is meshed with the gear 122. It is to be noted that if the feed screws 111 and 112 are of left hand and right hand relationship, then the idler gear 119 may be eliminated and an idler gear similar to the idler gear 127 inserted between the gears 121 and 122.

It has been stated above that the pitch of the feed screws specifically illustrated in FIGURES 1 through 11 is different at the opposite ends of the feed screws. Normally this pitch will constantly vary between the opposite ends of the feed screw. However, all types of combinations are feasible. For example, on the feed screw which does the actual conveying of an article, the two ends may be of different constant pitch and only the intermediate portion be of varying pitch while the return feed screw may be of a constant pitch throughout its length providing the pitch of like ends of the feed screws is the same. Also, when the feed mechanisms are used for purposes other than merely transferring an article from one place to another, it may be desirable to increase and then decrease the pitch of the feed screw intermediate its ends. It is to be understood that the pitch arrangement of the feed screw will vary depending upon the particular requirements of the feed mechanisms.

Referring now to FIGURES 12 and 13 in particular, it will be seen that there is illustrated another form of guide track and feed member arrangement. The guide track arrangement includes an inner guide track 185 and an outer guide track 186. Each of the guide tracks 185 and 186 is of a C-shaped construction with the guide tracks being preferably formed of a plurality of pieces although each could be formed of a single piece construction.

There is associated with the guide tracks 185 and 186 a plurality of feed members, which are generally referred to by the numeral 187. Each feed member 187 includes a rigid body member 188 and a push arm 189 which is secured to the body member by means of a fastener 190 and positioning pins 191. The push arm 189 extends to one side of the body member 188 and is of an offset construction, as is shown in FIGURE 13, so as to overlie and extend beyond the outer guide track 186.

Each body member 188 is provided with an inner of a curvature corresponding to the curvature of the inner surface which includes an arcuate central portion 192 guide track 185, as is clearly shown in FIGURE 12. On opposite sides of the arcuate central portion 192 are straight end portions 193 which are in alignment and are adapted to engage the inner guide track 185 along a straight portion thereof.

The outer surface of the body member 188 includes a straight intermediate portion 194 which is parallel to the straight portions 193 and is adapted to engage the outer guide track 186 along a straight portion thereof. The outer surface also includes curved end portions 195 which are engageable with the arcuate part of the outer guide track 186 in the manner shown in FIGURE 12.

Each of the ends of each body member 185, includes an outer straight portion 196 which is disposed substantially normal to the straight portions 193 and 194. The inner parts of the ends of the body member 188 are cut away to define beveled inner portions 197 which, in turn, provide the necessary clearance between adjacent body members 188 when the feed members 187 are disposed along the arcuate portions of the guide tracks 185 and 186, as is shown in FIGURE 12.

Reference is made to FIGURE 13 wherein there is shown each body member 188 as being of a hollow construction. This hollow construction is preferred in that it makes the body member lighter in weight and, therefore, there is less resistance to movement thereof within the guide tracks 185 and 186. It has been found that the specific shape of the body member 188 permits freedom of movement thereof between the guide tracks 185 and 186 both along the straight portions thereof and the arcuate portions thereof. Further, the simplicity of the construction of the body member 188 eliminates the need for rollers or other elements which require maintenance.

The underside of the body member 188 is provided at the forward end thereof with a follower 198 which corresponds to the followers 37 and 78 and is engageable with feed screws for effecting the feeding of the feed members 187 along the guide tracks 185 and 186 in the manner described above.

Reference is now made to the feed mechanism construction illustrated in FIGURES 14 through 19 of the drawings. This feed mechanism is generally referred to by the numeral 130 and includes a lower housing member 131 which is suitably carried by supports 132 in the manner shown in FIGURE 16. The lower housing member 131 is of a generally L-shaped configuration and is provided at the right hand side thereof, as viewed in FIGURE 16, with an upstanding leg 133 which, in cooperation with adjacent portions of the housing member 131, defines a generally longitudinally extending semi-cylindrical recess 134. A second longitudinally extending recess 135 of a generally rectangular cross section is disposed adjacent the recess 134. A keyway 136 is also formed in the upper surface of the housing member 131.

A second housing member 137 overlies and is removably secured to the housing member 131 by a plurality of bolts 138. The housing member 137 is of an offset construction and includes a first leg 139 having a keyway 140 therein matching the keyway 136. A key 141 is positioned in the keyways 136 and 140 and locks the housing member 137 to the housing member 131 in alignment. The bolts 138 pass through the leg 139 on opposite sides of the key 141.

The housing member 137 also includes an intermediate leg 142 which is vertically offset with respect to the leg 139 and which is generally aligned with the recess 135. The offset end of the leg 142, in combination with the recess 135 defines a passageway 143, the purpose of which will be described hereinafter.

The housing member 137 also includes an arcuate leg 144 which conforms generally to the configuration of the recess 134 and together with the recess 134 defines a generally cylindrical passage 145.

It is to be noted that mating portions of the housing members 131 and 137 define a guide panel 146 between the passageway 143 and the cylindrical passage 145. The mating portions of the housing members 131 and 137 also define a guideway 147 disposed in diametrically opposite relation with respect to the guideway 146 and opening between the exterior of the housing member and the cylindrical passage 145. Also, it is to be noted that the housing member 137 is reinforced by a plurality of transverse ribs 148.

A double threaded feed screw 149 extends through the cylindrical passage 145 in concentrically disposed relation relative thereto. The feed screw 149 is provided with crossing lead grooves 150 and 151 which are interconnected adjacent ends of the feed screw 149 by grooves 152.

The feed mechanism 130 includes a plurality of feed members which are identical and which are identified generally by the numeral 153. Each feed member 153 includes a sleeve portion, generally referred to by the numeral 154, which is seated intermediate the feed screw 149 and the housing members 131 and 137 in guided bearing relationship relative thereto. It is to be noted that each sleeve portion 154 including an outer part 155 at one end and an inner part 156 at the opposite end with the outer part 155 of the sleeve portion of one feed member 153 being telescoped over the inner part 156 of the sleeve portion of the next adjacent feed member 153. The telescoped sleeve parts 155 and 156 freely slide relative to one another and at the same time provide support for one another. In addition, due to the overlapping of the sleeve parts 155 and 156, the feed screw 149 is protected against the entrance of foreign matter thereinto through the guideway 147.

Each feed member 153 includes a body 157 which extends generally at right angles to the axis of the sleeve portion 154 so that the body 157 may be engaged within the guideways 146 and 147 and may extend radially outwardly with respect to the feed screw 149. The body 157 terminates in an offset push arm 158.

The vertical leg 133 of the housing member 131 supports a generally L-shaped article support 159. The article support 159 is braced at intervals by means of gussets 160. The article support 159 has an upper supporting surface 161 which underlies the push arms 158 of the feed members 153 projecting through the guideway 147 so that the push arms 158 may move articles along the surface 161 of the article support 159. The articles may include cans 162 shown in FIGURES 14 and 16.

In accordance with this invention, the feed members 153 are each provided with a follower 163 which is secured to the body 157 and projects beneath the sleeve portion 154 for engagement in the lead grooves of the feed screw 149. The follower 163 is mounted for pivotal movement relative to its associated feed member 153.

When the feed members 153 are associated with the guideway 147, the followers 163 are engaged in the lead groove 151, as is shown in FIGURE 17, and the feed members 153 are advanced from left to right. As the followers 163 leave the right ends of the lead groove 151, they enter into the connecting groove 152 and would normally be directly led by the connecting groove 152 into the lead groove 150 for rearward travel along the same line. However, because there are a plurality of feed members 153, the feed members 153 must rotate with and relative to the feed screw 149 as the followers 163 thereof pass along the connecting groove 152 so that the feed members 153, in their return travel, extend through the guideway 146. The main portions of the feed members 153 are then disposed within the passageway 143 in out-of-the-way positions and so remain until the followers 163 reach the left end of the lead groove 150 at which time the followers 163 engage into another connecting groove (not shown) for transfer around the feed screw 149 into the left end of the lead groove 151.

Specific feed or drive means are provided for effecting the rotation of the feed members 153 around the feed screw for movement first from the guideway 147 to the guideway 146 and then from the guideway 146 to the guideway 147. At both ends of the housing members 131 and 137 there is disposed a split housing 164. Each housing 164 includes an inner member 165, which is suitably secured to the housing member 131, and an outer housing 166, which is suitably secured to the inner member 165. The feed screw 149 is provided with reduced ends 167 which are suitably journalled in bearings 168 carried by the outer housing members 166. It is to be noted that one reduced end 167 projects through and beyond its associated member 164 to be driven in any desired manner.

A drive member, generally referred to by the numeral 169, is journalled on each end of the feed screw 149 by means of suitable bearings 170. The drive member 169 is provided with a stub shaft 170' on which there is rotatably journalled a planet pinion 171 of a planetary gearing system which includes a sun gear 172 carried by the associated reduced end 167. The pinion 171 is also meshed with a ring gear 173 which is fixedly secured to the associated housing member 165. The relationship of the gears 171 and 172 and 173 is such that the drive member 169 rotates in the same direction as the feed screw 149, but at one half the speed.

The drive member 169 is provided with a drum portion 174 which is telescoped over the adjacent portion of the feed screw 149. The drum portion 174 is sealed relative to the housing 164 by means of a seal structure 175. The exposed portion of the drum portion 174 is provided with a pair of diametrically opposite notches 176 which open out through the outer end of the drum portion 174. The notches 176 are of a size to receive the body of each feed member.

It is to be understood that the drives for the feed screw 149 and the drive members 169 are synchronized so that as the body of each feed member 153 passes out of the right hand end of the guideway 147, a notch 176 of the right hand drive member 169 is positioned for receiving the body. As the feed screw 149 and the drive member 169 rotate, due to the slow driving of the drive member 169, the feed screw 149 will advance relative to the feed member 153 although the feed member 153 is being rotated about the axis of the feed screw 149. The leg 142 of the housing member 137 is cut away at each end to define openings 177 through which portions of the feed members 153 may pass.

As the drive member 169 at the right end of the feed screw 149 completes a half revolution, the feed screw 149 completes a full revolution so that there is a one half revolution relative movement between the drive member 169 and the feed screw 149 with the follower 163 of the feed member being passed into the lead groove 150. At the same time, the notch 176 carrying the feed member 153 becomes aligned with the guideway 146 of the feed member and transfers the feed member into the guideway 146. The transfer of the feed member 153 at the left end of the feed screw 149 is the same as that described above with the exception that the feed member passes from the guideway 146 into the notch 176 of the left drive member 169 and then from the notch into the guideway 147 with the associated follower 163 being transferred from the lead groove 150 to the lead groove 151.

It is to be understood that the ends of the two sleeve parts 155 and 156 cannot be square cut in that there is a slowing down and reversal of movement of the feed members 153 longitudinally of the feed screw 149 as they are being transferred at the ends of the feed screw. Accordingly, it is necessary that the sleeve parts 155 and 156 each be of a generally flattened octagonal outline, as is clearly shown in FIGURE 19. This specific outline of the two sleeve parts 155 and 156 provides for the necessary clearance while at the same time providing for a maximum overlapping between the sleeve parts of adjacent feed members.

It is to be noted that since the feed members 153 are rotated about the feed screw 149 at the ends of their travel, articles cannot be fed to the feed mechanism 130 in the normal manner. Accordingly, there has been illustrated in FIGURE 14 a typical means of feeding articles, such as cans 162, to the feed mechanism 130 and for receiving the cans therefrom. A can delivery turret 177 may be mounted in the position shown at the left of FIGURE 14. In like manner, a can receiving turret 178 may be mounted in the position shown at the right end of FIGURE 14. It is to be noted that the pockets of the turret 178 are spaced apart a much greater distance than the pockets of the turret 177. It is to be understood, however, that the pitch of the feed screw 149 could decrease from left to right as opposed to increasing as the cans are moved. It is also to be understood that the grooves 150 and 151 and the feed screw 149 may be varied, if desired, depending upon the particular requirements of the feed mechanism 130.

Although the various structures specifically illustrated and described herein are intended for primary use as feed mechanism, it is to be understood that the invention is not so restricted. In the first place, in lieu of push arms, there could be substituted plates, tables, clamping fixtures, cutting tools, etc. Thus, the apparatus could be feasibly incorporated in machine tools or other apparatus wherein work is being done as either a tool or a workpiece is moved by the apparatus of this invention.

Although only preferred embodiments of the invention have been specifically illustrated and described herein, it is to be understood that minor modifications may be made therein in accordance with the spirit and scope of the invention, as defined in the appended claims.

What is claimed as new:

1. A feed mechanism comprising a pair of guides disposed in adjacent relation, a plurality of feed members engaged with said guides for advancement along one of said guides and return along the other of said guides, means maintaining said feed members in spaced apart relation at all times with there being a clear space between adjacent feed members, said means including transfer means at opposite ends of said guides for transferring said feed members from one of said guides to the other while maintaining said feed members in spaced relation and feed screw means disposed adjacent said guides and engaged with said feed members to effect the independent feeding of said feed members along said guides, said feed screw means terminating immediately adjacent said transfer means and cooperating therewith to define continuous feed means, and each of said feed members being disposed in controlled contact with said feed means at all times.

2. A feed mechanism comprising a pair of guides disposed in adjacent relation, a plurality of spaced apart feed members engaged with said guides for advancement along one of said guides and return along the other of said guides with there being a clear space between adjacent feed members, transfer means at opposite ends of said guides for transferring said feed members from one of said guides to the other while maintaining said feed members in spaced relation, and feed screw means disposed adjacent said guides and engaged with said feed members to effect the independent feeding of said feed members along said guides, said feed screw means terminating immediately adjacent said transfer means and cooperating therewith to define continuous feed means, and each of said feed members being disposed in controlled contact with said feed means at all times, said feed members being of the pusher type, and there being an elongated article support disposed adjacent one of said guides and in a position for engagement of said feed members with articles supported thereby.

3. A feed mechanism comprising a pair of guides disposed in adjacent relation, a plurality of spaced apart feed members engaged with said guides for advancement along one of said guides and return along the other of said guides, transfer means at opposite ends of said guides for transferring said feed members from one of said guides to the other while maintaining said feed members in spaced relation, and feed screw means disposed adjacent said guides and engaged with said feed members to effect the independent feeding of said feed members along said guides, said feed screw means being formed by a single double threaded feed screw.

4. The feed mechanism of claim 1 wherein said feed screw means are formed by two spaced apart feed screws.

5. The feed mechanism of claim 1 together with drive means driving said feed screw means and said transfer means in unison.

6. A feed mechanism comprising guide means defining an endless path including two straight portions, a feed screw mounted immediately adjacent to each of said straight portions, a plurality of feed members carried by said guide means for movement along said endless path, said feed members being engaged by said feed screws for movement along said straight portions, and transfer means mounted generally between adjacent ends of said straight portions for moving said feed members along said endless path between said straight portions, said feed screws each having a pitch gradually changing from one end to the other whereby the speeds of said feed members change as said feed members move along said straight portions, said feed screws being identical and rotating in opposite directions whereby the speed of each of said feed members is increased along one of said straight portions and similarly decreased along the other of said straight portions.

7. A feed mechanism comprising guide means defining an endless path including two straight portions, a feed screw mounted immediately adjacent to each of said straight portions, a plurality of spaced apart feed members carried by said guide means for movement along said endless path, said feed members being engaged by said feed screws for individual movement along said straight portions, and transfer means mounted generally between adjacent ends of said straight portions for separately moving said feed members along said endless path between said straight portions, said transfer means including transfer wheels having peripheral discontinuities thereon engageable with portions of said feed members.

8. A feed mechanism comprising guide means defining an endless path including two straight portions, a feed screw mounted immediately adjacent to each of said straight portions, a plurality of spaced apart feed members carried by said guide means for movement along said endless path, said feed members being engaged by said feed screws for individual movement along said straight portions, and transfer means mounted generally between adjacent ends of said straight portions for separately moving said feed members along said endless path between said straight portions, said feed members having a path of movement lying in a vertical plane with said feed screws and said transfer means lying in a vertical plane and with one of said feed screws being disposed uppermost, and an article support overlying said one feed screw, said article support having an opening therein extending longitudinally of said one feed screw, and each feed member having a pusher arm for extending through said article support opening.

9. A feed mechanism comprising guide means defining an endless path including two straight portions, a feed screw mounted immediately adjacent to each of said straight portions, a plurality of spaced apart feed members carried by said guide means for movement along said endless path, said feed members being engaged by said feed screws for individual movement along said straight portions, and transfer means mounted generally between adjacent ends of said straight portions for separately moving said feed members along said endless path between said straight portions, said feed members having a path of movement lying in a vertical plane, said guide means being in the form of opposed frame members having guideways therein, and said feed members having followers engaged in said guideways.

10. A feed mechanism comprising guide means defining an endless path including two straight portions, a feed screw mounted immediately adjacent to each of said straight portions, a plurality of spaced apart feed members carried by said guide means for movement along said endless path, said feed members being engaged by said feed screws for individual movement along said straight portions, and transfer means mounted generally between adjacent ends of said straight portions for separately moving said feed members along said endless path between said straight portions, said feed members having a path of movement lying in generally horizontal as opposed to a vertical plane, an article support disposed alongside one of said feed screws, and each of said feed members having a pusher arm overlying said article support for moving an article therealong.

11. A feed mechanism comprising a feed screw of the double pitch type including two main screw portions with connecting screw portions at opposite ends thereof, guide means adjacent said feed screw and in generally diametrically opposite relation, a plurality of feed members movable along said guide means and having followers engageable with said feed screw to effect the movement of each feed member along one of said guide means and then back along the other of said guide means, and transfer means adjacent each end of said feed screw for transferring said feed members back and fourth between said guide means.

12. The feed mechanism of claim 11 wherein said guide means are defined by a housing surrounding said feed screw.

13. The feed mechanism of claim 11 wherein said guide means are defined by a housing surrounding said feed screw, an article support connected to said housing, and each of said feed members including a push arm overlying said article support.

14. The feed mechanism of claim 11 wherein said transfer means includes a rotating drive member journalled at each end of said feed screw, temporary cooperating interlocking means on said feed members and said drive members to effect a partial rotation of said feed members around said feed screw.

15. The feed mechanism of claim 11 wherein said transfer means includes a rotating drive member journalled at each end of said feed screw, temporary cooperating interlocking means of said feed members and said drive members to effect a partial rotation of said feed members around said feed screw, and drive means interconnecting said feed screw and said drive members to drive said drive members in timed relation to said feed screw.

16. A feed mechanism comprising a feed screw of the double pitch type including two main screw portions with connecting screw portions at opposite ends thereof, guide means adjacent said feed screw and in generally diametrically opposite relation, a plurality of feed members movable along said guide means and having followers engageable with said feed screw to effect the movement of each feed member along one of said guide means and then back along the other of said guide means, and transfer means adjacent each end of said feed screw for transferring said feed members back and forth between said guide means, each feed member including a sleeve section riding on said feed screw.

17. A feed mechanism comprising a feed screw of the double pitch type including two main screw portions with connecting screw portions at opposite ends thereof, guide means adjacent said feed screw and in generally diametrically opposite relation, a plurality of feed members movable along said guide means and having followers engageable with said feed screw to effect the movement of each feed member along one of said guide means and then back along the other of said guide means, and transfer means adjacent each end of said feed screw for transferring said feed members back and forth between said guide means, each feed member including a sleeve section riding on said feed screw with sleeve sections of adjacent feed members being in overlapped freely telescoping relation to provide a maximum guiding support for said feed members and to shield said feed screw.

18. A feed mechanism comprising a feed screw of the double pitch type including two main screw portions with connecting screw portions at opposite ends thereof, guide means adjacent said feed screw and in generally diametrically opposite relation, a plurality of feed members movable along said guide means and having followers engageable with said feed screw to effect the movement of each feed member along one of said guide means and then back along the other of said guide means, and transfer means adjacent each end of said feed screw for transferring said feed members back and forth between said guide means, each feed member including a sleeve section riding on said feed screw with sleeve sections of adjacent feed members being in overlapped freely telescoping relation to provide a maximum guiding support for said feed members and to shield said feed screw, and said sleeve sections having transverse boundaries disposed in part in sloping relation to provide clearance between adjacent sleeve sections during the transfer of said feed members between said guide means.

19. A feed mechanism comprising guide means defining an endless path including two straight portions, a feed screw mounted immediately adjacent to each of said straight portions, a plurality of spaced apart feed members carried by said guide means for movement along said endless path, said feed members being engaged by said feed screws for individual movement along said straight portions, and transfer means mounted generally between adjacent ends of said straight portions for separately moving said feed members along said endless path between said straight portions, each feed member including a body member having a push arm extending therefrom, said body member being in the form of a rigid block seated within said guide means, said body member having inner and outer side surfaces in guided engagement with said guide means, said inner side surface including a central curved portion, and said outer side surface including curved end portions, the curvature of said curved portions being in accordance with opposing curved portions of said guide means.

20. The feed mechanism of claim 19 wherein said body member has ends with beveled inner portions to provide clearance relative to other adjacent body members as said body members pass along said guide means curved portions.

21. The feed mechanism of claim 19 wherein said inner side surface includes aligned straight end portions and said outer side surface includes a central straight portion disposed parallel to said inner side surface end portions, said straight portions being particularly adapted for engaging straight portions of said guide means.

References Cited by the Examiner

UNITED STATES PATENTS

| | | |
|---|---|---|
| 2,570,264 | 10/1951 | Nordquist et al. |
| 2,789,683 | 4/1957 | Stahl _____ 198—110 |
| 2,817,703 | 12/1957 | Naxon. |
| 2,971,634 | 2/1961 | Wilde et al. _____ 198—181 |

SAMUEL F. COLEMAN, *Primary Examiner.*

WILLIAM B. LA BORDE, *Examiner.*